(12) United States Patent
Prater

(10) Patent No.: US 11,885,745 B2
(45) Date of Patent: Jan. 30, 2024

(54) FLUORESCENCE ENHANCED PHOTOTHERMAL INFRARED SPECTROSCOPY AND CONFOCAL FLUORESCENCE IMAGING

(71) Applicant: Photothermal Spectroscopy Corp., Santa Barbara, CA (US)

(72) Inventor: Craig Prater, Santa Barbara, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 0 days.

(21) Appl. No.: 17/872,418

(22) Filed: Jul. 25, 2022

(65) Prior Publication Data

US 2022/0357275 A1  Nov. 10, 2022

Related U.S. Application Data

(63) Continuation of application No. 17/381,021, filed on Jul. 20, 2021, now Pat. No. 11,519,861.
(Continued)

(51) Int. Cl.
*G01N 21/64* (2006.01)
*G01N 21/359* (2014.01)
(Continued)

(52) U.S. Cl.
CPC .......... *G01N 21/645* (2013.01); *G01J 3/0227* (2013.01); *G01N 21/359* (2013.01);
(Continued)

(58) Field of Classification Search
CPC ............... G01N 21/645; G01N 21/359; G01N 2021/3595; G01N 2021/6471; G01N 2021/1744; G01J 3/0227
See application file for complete search history.

(56) References Cited

U.S. PATENT DOCUMENTS 2,940,355 A   6/1960  Cary
5,574,562 A   11/1996 Fishman et al.
(Continued)

FOREIGN PATENT DOCUMENTS

CN     105699358 A     6/2016
DE   102014108424 B3   6/2015
(Continued)

OTHER PUBLICATIONS

Miyazaki et al., Photothermal Microscopy for High Sensitivity and High Resolution Absorption Contrast Imaging of Biological Tissues, 2017, Photonics, vol. 4, pp. 1-12. (Year: 2017).*
(Continued)

*Primary Examiner* — Christine S. Kim
(74) *Attorney, Agent, or Firm* — MERCHANT & GOULD P.C.

(57) ABSTRACT

Embodiments disclosed include methods and apparatus for Fluorescent Enhanced Photothermal Infrared (FE-PTIR) spectroscopy and chemical imaging, which enables high sensitivity and high spatial resolution measurements of IR absorption with simultaneous confocal fluorescence imaging. In various embodiments, the FE-PTIR technique utilizes combined/simultaneous OPTIR and fluorescence imaging that provides significant improvements and benefits compared to previous work by simultaneous detection of both IR absorption and confocal fluorescence using the same optical detector at the same time.

24 Claims, 6 Drawing Sheets

Related U.S. Application Data

(60) Provisional application No. 63/054,167, filed on Jul. 20, 2020.

(51) Int. Cl.
*G01J 3/02* (2006.01)
*G01N 21/3563* (2014.01)
*G01N 21/35* (2014.01)

(52) U.S. Cl.
CPC ..... *G01N 21/3563* (2013.01); *G01N 21/6428* (2013.01); *G01N 21/6456* (2013.01); *G01N 2021/3595* (2013.01); *G01N 2021/6439* (2013.01); *G01N 2021/6471* (2013.01)

(56) References Cited

U.S. PATENT DOCUMENTS

| | | |
|---|---|---|
| 6,532,070 B1 | 3/2003 | Hovinen et al. |
| 7,630,081 B2 | 12/2009 | Ressler et al. |
| 7,855,780 B1 | 12/2010 | Djeu |
| 8,001,830 B2 | 8/2011 | Dazzi et al. |
| 8,242,448 B2 | 8/2012 | Prater et al. |
| 8,402,819 B2 | 3/2013 | Dazzi et al. |
| 8,607,622 B2 | 12/2013 | Dazzi et al. |
| 8,646,319 B2 | 2/2014 | Prater et al. |
| 8,680,457 B2 | 3/2014 | Maxik et al. |
| 8,793,811 B1 | 7/2014 | Prater et al. |
| 8,869,602 B2 | 10/2014 | Belkin et al. |
| 9,046,492 B1 | 6/2015 | Prater |
| 9,091,594 B2 | 7/2015 | Furstenberg et al. |
| 9,134,341 B2 | 9/2015 | Prater et al. |
| 9,250,061 B2 | 2/2016 | Lorbeer et al. |
| 9,372,154 B2 | 6/2016 | Prater |
| 9,658,247 B2 | 5/2017 | Yang et al. |
| 9,841,324 B2 | 12/2017 | Furstenberg et al. |
| 10,228,388 B2 | 3/2019 | Prater et al. |
| 10,228,389 B2 | 3/2019 | Yang et al. |
| 10,241,131 B2 | 3/2019 | Prater |
| 10,473,693 B2 | 11/2019 | Yang et al. |
| 10,677,722 B2 | 6/2020 | Li et al. |
| 10,696,405 B2 | 6/2020 | Dowty et al. |
| 10,845,248 B1 * | 11/2020 | Cheng .......... G01J 3/10 |
| 10,942,116 B2 | 3/2021 | Prater et al. |
| 10,969,405 B2 | 4/2021 | Shetty et al. |
| 2002/0105641 A1 | 8/2002 | Anderson |
| 2004/0085540 A1 | 5/2004 | Lapotko et al. |
| 2004/0188602 A1 | 9/2004 | Chinn et al. |
| 2005/0105099 A1 | 5/2005 | Shpantzer et al. |
| 2008/0058649 A1 * | 3/2008 | Boyden .......... A61B 5/412 600/476 |
| 2008/0304046 A1 | 12/2008 | Lee et al. |
| 2009/0161092 A1 | 6/2009 | Zanni et al. |
| 2009/0236528 A1 | 9/2009 | Shpantzer et al. |
| 2009/0249521 A1 | 10/2009 | Dazzi et al. |
| 2010/0044570 A1 | 2/2010 | McGill et al. |
| 2010/0079842 A1 | 4/2010 | Dunleavy et al. |
| 2010/0315646 A1 | 12/2010 | Chism, II |
| 2010/0320171 A1 | 12/2010 | Mao et al. |
| 2011/0122488 A1 | 5/2011 | Truong et al. |
| 2011/0248166 A1 | 10/2011 | Diem et al. |
| 2012/0002030 A1 | 1/2012 | Kalkbrenner et al. |
| 2012/0026485 A1 | 2/2012 | Couston et al. |
| 2012/0122084 A1 | 5/2012 | Wagner et al. |
| 2012/0167261 A1 | 6/2012 | Belkin et al. |
| 2012/0314206 A1 | 12/2012 | Spizig et al. |
| 2013/0134310 A1 | 5/2013 | Furstenberg et al. |
| 2013/0162994 A1 | 6/2013 | Xie et al. |
| 2014/0009808 A1 | 1/2014 | Wang et al. |
| 2014/0289912 A1 | 9/2014 | Andreev |
| 2014/0361150 A1 | 12/2014 | Cheng et al. |
| 2015/0085098 A1 | 3/2015 | Dowaki et al. |
| 2015/0219684 A1 | 8/2015 | Humphris et al. |
| 2015/0285836 A1 | 10/2015 | Humphris et al. |
| 2015/0308947 A1 | 10/2015 | Xu et al. |
| 2016/0011049 A1 | 1/2016 | Furstenberg et al. |
| 2016/0161245 A1 | 6/2016 | Fu et al. |
| 2017/0127983 A1 | 5/2017 | Spegazzini et al. |
| 2017/0146455 A1 | 5/2017 | Mantele et al. |
| 2018/0007343 A1 | 1/2018 | Send et al. |
| 2018/0052186 A1 | 2/2018 | Su et al. |
| 2018/0088041 A1 | 3/2018 | Zhang et al. |
| 2018/0156674 A1 | 6/2018 | Fleming et al. |
| 2018/0180642 A1 | 6/2018 | Shetty et al. |
| 2018/0246032 A1 * | 8/2018 | Li ............... G01N 21/3563 |
| 2018/0259553 A1 | 9/2018 | Yang et al. |
| 2018/0364158 A1 | 12/2018 | Wang et al. |
| 2019/0120753 A1 * | 4/2019 | Prater .......... G01N 23/207 |
| 2019/0204230 A1 | 7/2019 | Ota |
| 2019/0317012 A1 * | 10/2019 | Furstenberg ...... G01N 21/171 |
| 2020/0025677 A1 | 1/2020 | Prater et al. |
| 2020/0217643 A1 | 7/2020 | Schnell et al. |
| 2020/0378829 A1 | 12/2020 | Decker et al. |
| 2021/0003504 A1 | 1/2021 | Li et al. |
| 2022/0018773 A1 | 1/2022 | Prater |

FOREIGN PATENT DOCUMENTS

| | | | |
|---|---|---|---|
| JP | 2020204594 A * | 12/2020 | |
| JP | 2020204594 A | 12/2020 | |
| WO | WO-2013078471 A1 | 5/2013 | |
| WO | WO-2018102467 A1 * | 6/2018 | ........ G01J 3/28 |

OTHER PUBLICATIONS

Li et al., Fluorescence-Detected Mid-Infrared Photothermal Microscopy, Jul. 16, 2021, J.Am.Chem.Soc. Vol. 143, pp. 10809-10815 (Year: 2021).*

Razumtcev et al., Label-Free Autofluorescence-Detected Mid-Infrared Photothermal Microscopy of Pharmaceutical Materials, Apr. 21, 2022, Anal.Chem. vol. 94, pp. 6512-6520. (Year: 2022).*

Article "Helium-Neon Laser," University of New Mexico, retrieved from http:www.phys.unm.edu/msbahae/Optics%20Lab/HeNe%20Laser.pdf, Nov. 22, 2012, 6 pages.

Article "Photothermal Lens Technique—Theory and Instrumentation," Swofford, 2015, 42 pages.

Bialkowski S E., et al., "Ultrasensitive Photothermal Deflection Spectrometry Using an Analyzer Etalon," American Chemical Society, 1988, 6 pages.

Bialkowski S E., "Pulsed-Laser Excited Differential Photothermal Deflection Spectroscopy," 1992, 11 pages.

Bialkowski S.E., "Application of the BaTi03 Beam-Fanning Optical Limiter as an Adaptive Spatial Filter for Signal Enhancement in Pulsed Infrared Laser-Excited Photothermal Spectroscopy," Optics Letters, Sep. 15, 1989, 3 pages.

Boyer D., et al., "Photothermal Imaging of Nanometer-Sized Metal Particles Among Scatters," Aug. 2002, vol. 297, Downloaded from www.sciencemag.org on Feb. 9, 2009, 4 pages.

Brandstetter M., et al., "High Power Terahertz Quantum Cascade Lasers with Symmetric Wafer Bonded Active Regions," Applied Physics Letters 103, 171113 2013, 6 pages.

Burghoff D., et al., "Terahertz Laser Frequency Combs," Nature Photonics, vol. 8, Jun. 2014, 10 pages.

Callaway E., "It Opens up a Whole New Universe: Revolutionary Microscopy Technique Sees Individual Atoms for First Time," Nature, vol. 582, Jun. 11, 2020, 2 pages.

Cariou J M., et al., "Refractive-Index Variations with Temperature of PMMA and polycarbonate," Applied Optics, 1986, vol. 25 (3), 3 pages.

Cho P.S., et al., "Investigation of Standoff Explosives Detection via Photothermal/Photoacoustic Interferometry," Chemical, Biological, Radiological, Nuclear and Explosives (CBRNE) Sensing XII, vol. 8018, No. 1, May 13, 2011, 15 pages.

Dowrey A.E., et al., "Industrial Applications of Near-IR Imaging," In Spectrochemical Analysis Using Infrared Multichannel Detectors, Chapter 8, Blackwell Publishing, 2005, pp. 175-188.

Fournier D. et al., "Tomographic Approach for Photothermal Imaging Using the Mirage Effect," Journal of Physique Colloques, 1983, pp. C6-479-C6-482.

(56) References Cited

OTHER PUBLICATIONS

Furstenber R., et al., "Chemical Imaging Using Infrared Photo-Thermal Microspectroscopy," U.S. Naval Research Laboratory, 2012, 10 pages.

Gaiduk A. et al., "Supporting Online Material for Room-Temperature Detection of a Single Molecule's Absorption by Photothermal Contrast," Science, Oct. 15, 2010, vol. 330, 14 pages.

Gorgulu K., et al., "All-Silicon Ultra-Broadband Infrared Light Absorbers," Scientific Reports, Dec. 7, 2016, pp. 1-7.

Grodecki K., et al., "Optical Absorption and Raman Scattering Studies of Few-Layer Epitaxial Graphene Grown on 4H-SiC Substrates," Nov. 2009, pp. 835-837.

Harada M., et al., "Photothermal Microscopy with Excitation and Probe Beams Coaxial Under the Microscope and Its Application to Microparticle Analysis," 1993, pp. 2938-2940.

Harthcock M A., et al., "Applications of Transmittance and Reflectance Micro/FT-IR to Polymeric Materials," 1986, vol. 40, Issue 2, pp. 210-214.

Harthcock M A., et al., "Imaging with Functional Group Maps Using Infrared Microspectroscopy," 1988, vol. 42, Issue 3, pp. 449-455.

Hemming A., et al., "A High Power Mid-IR ZGP Ring OPO," with over 30 W of optical power, 2013, 2 pages.

Inoue T., et al., "Realization of Dynamic Thermal Emission Control," Jul. 27, 2014, pp. 928-931.

Jiang N., et al., "Narrow-Linewidth Megahertz-Repetition-Rate Optical Parametric Oscillator for High-Speed Flow and Combustion Diagnostics," Applied Optics, vol. 47, No. 1, Jan. 2008, pp. 64-71.

Jiang P., et al., "Compact High Power Mid-Infrared Optical Parametric Oscillator Pumped by a Gain-Switched Fiber Laser with 'Figure-of-h' Pulse Shape," Optical Society of America, vol. 23, No. 3, Jan. 2015, 6 pages.

Jung J.Y., et al., "Infrared Broadband Metasurface Absorber for Reducing the Thermal Mass of a Microbolometer," Scientific Reports, Mar. 2017, pp. 1-8.

Kluk D., et al., "A High-Bandwidth, High-Precision, Two-Axis Steering Mirror with moving Iron Actuator," 2010, pp. 552-557.

Lasne D., et al., "Label-Free Optical Imaging of Mitochondria in Live Cells," Optical Society of America, 2007, 10 pages.

Li C., et al., "Mid-Infrared Photothermal Imaging of Active Pharmaceutical Ingredients at Submicrometer Spatial Resolution," Anal. Chem., 89, 2017, 4863-4867.

Li Z., et al., "Super-Resolution Far-Field Infrared Imaging by Photothermal Heterodyne Imaging," The Journal of Physical Chemistry B, 2017, pp. 8838-8846.

Li Z., et al., "Super-Resolution Imaging with Mid-IR Photothermal Microscopy on the Single Particle Level," Physical Chemistry of Interfaces and Nanomaterials, Proceedings of SPIE, Aug. 20, 2015, vol. 9549, 954912-1 to 954912-8, 8 pages.

Li Z., et al., "Super-Resolution Mid-Infrared Imaging Using Photothermal Microscopy," Conference on Lasers and Electro-Optics, Optical Society of America, San Jose, California, 2016, p. ATu3J7.pdf, 2 pages.

Liu M., "Differential Interference Contrast-Photothermal Microscopy in Nanospace: Impacts of Systematic Parameters," Mar. 2017, 9 Pages.

Marcott C., et al., "Mining the Information Content Buried in Infrared and Near-Infrared Band Shapes by Temporal, Spatial, and Other Perturbations," Applied Spectroscopy, vol. 63, No. 12, 2009, pp. 346A-354A.

Mertiri A., et al., "Label Free Mid-IR Photothermal Imaging of Bird Brain With Quantum Cascade Laser," Optical Society of America, 2014, 2 pages.

Mertiri A et al., "Mid-Infrared Photothermal Heterodyne Spectroscopy in a Liquid Crystal Using a Quantum Cascade Laser," Applied Physics Letters, vol. 101, 2012, pp. 1-4.

Mertiri A., et al., "Nonlinear Midinfrared Photothermal Spectroscopy Using Zharov Splitting and Quantum Cascade Lasers," ACS Photonics, American Chemical Society, vol. 1, 2014, pp. 696-702.

Miyazaki et al., "Photothermal Microscopy for High Sensitivity and High Resolution Absorption Biological Tissues," 2017, Photonics, vol. 4, pp. 1-12 (Year; 2017).

Moscatelli A., "Tiny Lenses for Miniature Devices," Dec. 2019, 1 page.

Nedosekin D.A., et al., "Photothermal Confocal Spectromicroscopy of Multiple Cellular Chromophores and Fluorophores," Biophysical Journal, Feb. 1, 2012, 10 pages.

Optotronics, "532nm Green Laser Systems," https://www.optotronics.com/532nm-green-laser-systems.php, 2017, 2 pages.

Peng Y F., et al., "High-Power Mid-Infrared Tunable Optical Parametric Oscillator Based on 3-mm-Thick PPMgCLN," 2012, pp. 87-90.

Sander M.Y., "Mid-Infrared Photothermal Imaging," Laser Science, Optical Society of America, 2015, p. LM11.2.pdf, 1 page.

Selmke M., et al., "Photothermal Single Particle Microscopy: Detection of a Nanolens," ACS Nano, Retrieved from https://arxiv.org/abs/1105.3815v1, 2012, 11 pages.

Stolyarov A.M., et al., "Photothermal Speckle Modulation for Noncontact Materials Characterization," Opt. Lett., 40, 24, Dec. 15, 2015, pp. 5786-5789.

Sullenberger R.M., et al., "Spatially-Resolved Individual Particle Spectroscopy Using Photothermal Modulation of Mie Scattering," Optical Society of America, vol. 42, No. 2, Jan. 15, 2017, pp. 203-206.

Tapos F.M., et al., "High Bandwidth Fast Steering Mirror," Optomechanics, Proceedings of SPIE, vol. 5877, 2005, 14 pages.

Totachawattana A., et al. "Optimization of Mid-IR Photothermal Imaging for Tissue Analysis," Visual Communications and Image Processing, Aug. 26, 2015, 7pages.

Wang et al., "High-Power Terahertz Quantum Cascade Lasers with ~0.23 W in Continuous Wave Mode," AIP Advances, 2016, 6 pages.

Webpage—Optotronics—https://www.optotronics.com/532nm-green-laser-systems.php, 2017, 2 pages.

Winefordner J.D., et al., "Comparison of Calculated Detection Limits in Molecular Absorption, Molecular Luminescence, Raman, Molecular Ionization, and Photothermal Spectrometry," Applied Spectroscopy, vol. 39, No. 3, May 1985, pp. 377-391.

Zanuto V S., et al., "Analysis of the Thermo-Reflectivity Coefficient Influence Using Photothermal Pump-Probe Techniques," 2016, 7 pages.

Zhang D., et al., "Depth-Resolved Mid-Infrared Photothermal Imaging of Living Cells and Organisms with Submicrometer Spatial Resolution," Science Advances, Sep. 28, 2016, 8 pages.

Zhao X., et al., "Heterogeneous and Cross-Distributed Metal Structure Hybridized withMos2 as High-Performance Flexible SERS Substrate," Sep. 2018, 13 pages.

Miller L. et al., "Chemical Imaging of Biological Tissue with Synchrotron Infrared Light," Science Direct, Biochimica et Biophysica Acta 1758 (2006) 846-857.

Byler M. et al., "Examination of the Secondary Structure of Proteins by Deconvolved FTIR Spectra," Research Center, U.S. Department of Agriculture, vol. 25, (1986) 469-487.

Susi H. et al., "Estimation of β-structure Content of Proteins by Means of Deconvolved FTIR Spectra," Journal of Biochemical and Biophysical Methods, 11 (1985) 235-240.

Choo L. et al., "In Situ Characterization of β-Amyloid in Alzheimer's Diseased Tissue by Synchrotron Fourier Transform Microspectroscopy," Biophysical Journal, vol. 71, (1996) 1672-1679.

Miller L. et al., "Synchrotron-Based Infrared and X-Ray Imagining Shows Focalized Accumulation of Cu and Zn co-localized with β-amyloid Deposits in Alzheimer's Disease," Journal of Structural Biology, 155 (2006) 30-37.

Gallant M. et al., "Focally Elevated Creatine Detected in Amyloid Precursor Protein (APP) Transgenic Mice and Alzheimer Disease Brain Tissue," The Journal of Biological Chemistry, vol. 281, No. 1, (2006) pp. 5-8.

Kneipp J. et al., "Detection of Pathological Molecular Alterations in Scrapie-Infected Hamster Brain by Fourier Transform Infrared (FT-IR) Spectroscopy," Biochimica et Biophysica Acta 1501 (2000) 189-199.

(56) References Cited

OTHER PUBLICATIONS

Kneipp J. et al., "In Situ Identification of Protein Structural Changes in Prion-Infected Tissue," Biochimica et Biophysica Acta 1639 (2003) 152-158.

Kneipp J. et al., "Scrapie-Infected Cells Isolated Prions, and Recombinant Prion Protein: A Camparative Study," Robert Koch Institute/ National Synchroton Light Source (2003) pp. 163-167.

Wang Q. et al., "In Situ Characterization of Prion Protein Structure and Metal Accumulation in Scrapie-Infected Cells by Synchrotron Infrared and X-Ray Imaging," Vibrational Spectroscopy 38 (2005) 61-69.

Huang R. et al., "Characterization of Bone Mineral Composition in the Proximal Tibia of Cynomolgus Monkeys: Effect of Ovariectomy and Nandrolone Decanoate Treatment," Bone vol. 30, No. 3 (2022) 492-497.

Huang R. et al., "In Situ Chemistry of Osteoporosis Revealed by Synchrotron Infrared Microspectroscopy," Bone 33 (2003) 514-521.

Ruppel M. et al., "Chemical Makeup of Microdamaged Bone Differs from Undamaged Bone," Bone 39 (2006) 318-324.

Miller L. et al., "In Situ Analysis of Mineral Content and Crystallinity in Bone Using Infrared Micro-Spectroscopy of the v4 PO ¾-Vibration," Biochimica et Miophysica Acta 1527 (2001) 11-19.

Miller L. et al., "Alterations in Mineral Composition Observed in Osteoarthritic Joints of Cynomolgus Monkeys," Bone 35 (2004) 498-506.

Wang Q. et al., "Infrared Imaging of Compositional Changes in Inflammatory Cardiomyopathy," Vibrational Spectroscopy 38 (2005) 217-222.

Gough K. et al., "Fourier Transform Infrared Evaluation of Microscopic Scarring in the Cardiomyopathie Heart: Effect of Chronic AT1 Suppression," Analytical Biochemistry 316 (2003) 232-242.

Sutton S. et al., "Microfluorescence and Microtomography Analyses of Heterogeneous Earth and Environmental Materials," Department of Geophysical Sciences (2002) 429-483.

Tomik B. et al., "Implementation of X-Ray Fluorescence Microscopy for Investigation of Elemental Abnormalities in Amyotrophic Lateral Sclerosis," Springer Science+Business Media, Inc. (2006) 321-331.

Collingwood J et al., "In Situ Characterization and Mapping of Iron Compounds in Alzheimer's Disease Tissue," Journal of Alzheimer's Disease 7 (2005) 267-272.

Geraki K. et al., "X-Ray Fluorescence and Energy Dispersive X-Ray Diffraction for the Quantification of Elemental Concentrations in Breast Tissue," Physics in Medicine & Biology 49 (2004) 99-110.

Shimojo N. et al., "Mercury Dynamics in Hair of Rats Exposed to Methylmercury by Synchrotron Radiation X-Ray Fluorescence imaging," Life Sciences vol. 60, No. 23 (1997) 2129-2137.

Minder B. et al., "Exposure to Lead and Specific Attentional Problems in Schoolchildren," Journal of Learning Disabilities, vol. 27, No. 6 (1994) 393-399.

Guntern R. et al., "An Improved Thioflavine S Method for Staining Neurofibrillary Tangles and Senile Plaques in Alzheimer's Disease," Experimentia 48 (1992) 8-10.

Miller J. et al., "Development and Applications of an Epifuorescence Module for Synchrotron X-Ray Fluorscence Microprobe Imaging," Review of Scientific Instruments 76, 066107 (2005) 6 pgs.

Lovell M. et al., "Copper, Iron and Zinc in Alzheimer's Disease Senile Plaques," Journal of Neurological Sciences 158 (1998) 47-52.

Szczerbowska-Boruchowska M. et al., "Intraneuronal Investigations of Organic Components and Trace Elements with the Use of Synchrotron Radiation," X-Ray Spectrometry 34 (2005) 514-520.

Bush A. et al., "Rapid Induction of Alzheimer A β Amyloid Formation by Zinc," American Association for the Advancement of Science vol. 265, No. 5177 (1994) 1464-1467.

Cuajungco M. et al., "Evidence that the β-amyloid Plaques of Alzheimer's Disease Represent the Redox-silencing and Entombment of Aβ by Zinc," The Journal of Biological Chemistry vol. 275, No. 26 (2000) 19439-19442.

Kalasinsky K. et al., "Study of Drug Distribution in Hain by Infrared Microscopy Visualization," Journal of Analytical Toxicology, vol. 18 (1994) 337-341.

Bantignies J. et al., "Chemical Imaging of Hair by Infrared Microspectroscopy Using Radiation," J. Cosmet. Sci. 51 (2000) 73-90.

Betrand L. et al., "Microbeam Synchrotron Imaging of Hairs from Ancient Egyptian Mummies," J. Synchrotron Rad. 10 (2003) 387-392.

Kempson I. et al., "Advanced Analysis of Metal Distributions in Human Hair," Environ. Sci. Technol. 40 (2006) 3423-3428.

Ansari A. et al., "Theory of Photoselection by Intense Light Pulses, Influence of Reorientational Dynamics and Chemical Kinetics on Absorbance Measurements," Biophys. J. vol. 64 (1993) 838-851.

Chattoraj M. et al., "Ultra-Fast Excited State Dynamics in Green Fluorescent Protein: Multiple States and Proton Transfer," Proc. Natl. Acad. Sci. USA vol. 93 (1996) 8362-8367.

Esposito A. et al., "Vibrational Spectroscopy and Mode Assignments for an Analog of the Green Fluorescent Protein Chromophore," Journal Molecular Structure 569 (2001) 25-41.

He X. et al., "Isotopic Labeling and Normal-Mode Analysis of a Model Green Fluorescent Protein Chromophore," J. Phys. Chem. B 106 (2002) 6056-6066.

Kennis J. et a., "Uncovering the Hidden Ground State of Green Fluorescent Protein," PNAS vol. 101, No. 52 (2004) 17988-17993.

Lim M., "The Orientation of CO in Heme Proteins Determined by Time-Resolved Mid-IR Spectroscopy: Anisotropy Correction for Finite Photolysis of an Optically Thick Sample," Bull. Korean Chem. Soc. vol. 23, No. 6 (2002) 865-871.

Lim M. et al., "Binding of CO to Myoglobin from a Heme Pocket Docking Site to Form Nearly Linear-Fe—C—O," Science, New Seris, vol. 269, No. 5226 (1995) 962-966.

Lim M. et al., "Orientation Distribution of CO Before and After Photolysis of MbCO and HbCO: A Determination Using Time-Resolved Polarized Mid-IR Spectroscopy," JACS Articles 126)2004) 7946-7957.

Shi X., et al., "Anomalous Negative Fluorescence Anisotrphy in Yellow Fluorescent Protein (YFP 10C): Quantitative Analysis of FRET in YFP Dimers," Biochemistry 46 (2007) 14403-14417.

Spiro T. et al., "Discordant Results on FeCO Deformability in Heme Proteins Reconciled by Density Functional Theory," J. Am. Chem. Soc. 120 (1998) 4524-4525.

Stoner-Ma D. et al., "Observation of Excited-State Proton Transfer in Green Fluorescent Protein Using Ultrafast Vibrational Spectroscopy," J. Am. Chem. Soc. 127 (2005) 2864-2865.

Stoner-Ma D. et al., "Proton Relay Reaction in Green Fluorescent Protein (GFP): Polarization-Resolved Ultrafast Vibrational Spectroscopy of Isotopically Edited GFP," J. Phys, Chem. B 110 (2006) 22009-22018.

Tsien R., "The Green Fluorescent Protein," Annu. Rev. Biochem. 67 (1998) 509-544.

Usman A. et al., "Excited-State Structure Determination of the Green Fluorescent Protein Chromophore," J. Am. Chem. Soc. 127 (2005) 11214-11215.

Van Thor J. et al., "Ultrafast and Low Barrier Motions in the Photoreactions of the Green Fluorescent Protein," The Journal of Biological Chemistry vol. 280, No. 39 (2005) 33652-33659.

Van Thor J. et al., "Balance Between Ultrafast Parallel Reactions in the Green Fluorescent Protein Has a Structural Origin," Biophysical Journal vol. 95 (2008) 1902-1912.

Van Thor J. et al., "Charge Transfer in Green Fluorescent Protein," Photochem. Photobiol. Sci. 5 (2006) 597-602.

Van Thor J. et al., "Structural Events in the Photocycle of Green Fluorescent Protein," J. Phys. Chem. B 109 (2005) 16099-16108.

Weber W. et al., "Shedding Light on the Dark and Weakly Fluroscent States of Green Fluorescent Proteins," Proc. Natl. Acad. Sci. USA vol. 96 (1999) 6177-6182.

Kalasinsky K., Drug Distribution in Human Hair by Infrared Microscopy, Cell Mol Biol 44(1) (1998) 81-87 (Abstract).

(56) References Cited

OTHER PUBLICATIONS

Blanc D. et al., "[Green Hair: Clinical, Chemical and Epidemiologic Study. Apropos of a Case}," Ann Dermatol Venereol 115(8) (1988) 807-812 (Abstract).

Chwief J. et al., "Classification of Nerve Cells from Substantia Negra of Patients with Parkinson's Disease and Amyotrophic Lateral Sclerosis with the Use of X-Ray Fluorescence Microscopy and Multivariate Methods," Anal. Chem. 77 (2005) 2895-2900.

Kumar V. et al., Chapter 16—Ultrafast Time-Resolved Molecular Spectroscopy, Department of Physical Chemistry (2020) 563-594.

Ritter E. et al., "Time-Resolved Infrared Spectroscopic Techniques as Applied to Channelrhodopsin," Frontiers in Molecular Biosciences vol. 2, Article 39 (2015) 1-7.

Miller L. et al. "A New Sample Substrate for Imaging and Correlating Organic and Trace Metal Composition in Biological Cells and Tissues," Anal Bioanal Chem 387 (2007) 1705-1715.

Van Thor J. et al., "Deriving Molecular Information From Photoselection Experiments of the Green Fluorescent Protein Using Intense Femtosecond Pulses," Central Laser Facility Annual Report (2007-2008) 164-168.

Zhang Y. et al., "Fluorescence-Detected Mid-Infrared Photothermal Microscopy," J. Am. Chem. 143 (2021) 11490-11499.

Chimenti R., "Researchers Demonstrate New Approaches to IR Microscopy," Laser Focus World (2021) 9 pages.

PCT Application No. PCT/US2021/42378, Search Report and Written Opinion dated Oct. 22, 2021, 13 pages.

Application and File History for U.S. Appl. No. 14/748,430, filed Jun. 24, 2015, inventors Furstenberg, et al.

Application and File History for U.S. Appl. No. 15/715,534, filed Sep. 26, 2017, Inventors: Zhang et al.

Application and File History for U.S. Appl. No. 15/826,147, filed Nov. 29, 2017, inventors Shetty, et al.

Application and File History for U.S. Appl. No. 16/155,089, filed Oct. 9, 2018, Inventors: Prater et al.

Application and File History for U.S. Appl. No. 16/877,152, filed May 18, 2020, inventors Li, et al.

Application and file history for U.S. Appl. No. 16/427,866, filed, May 31, 2019. Inventors: Decker et al.

Application and file history for U.S. Appl. No. 17/381,021, filed Jul. 20, 2021. Inventors: Prater.

\* cited by examiner

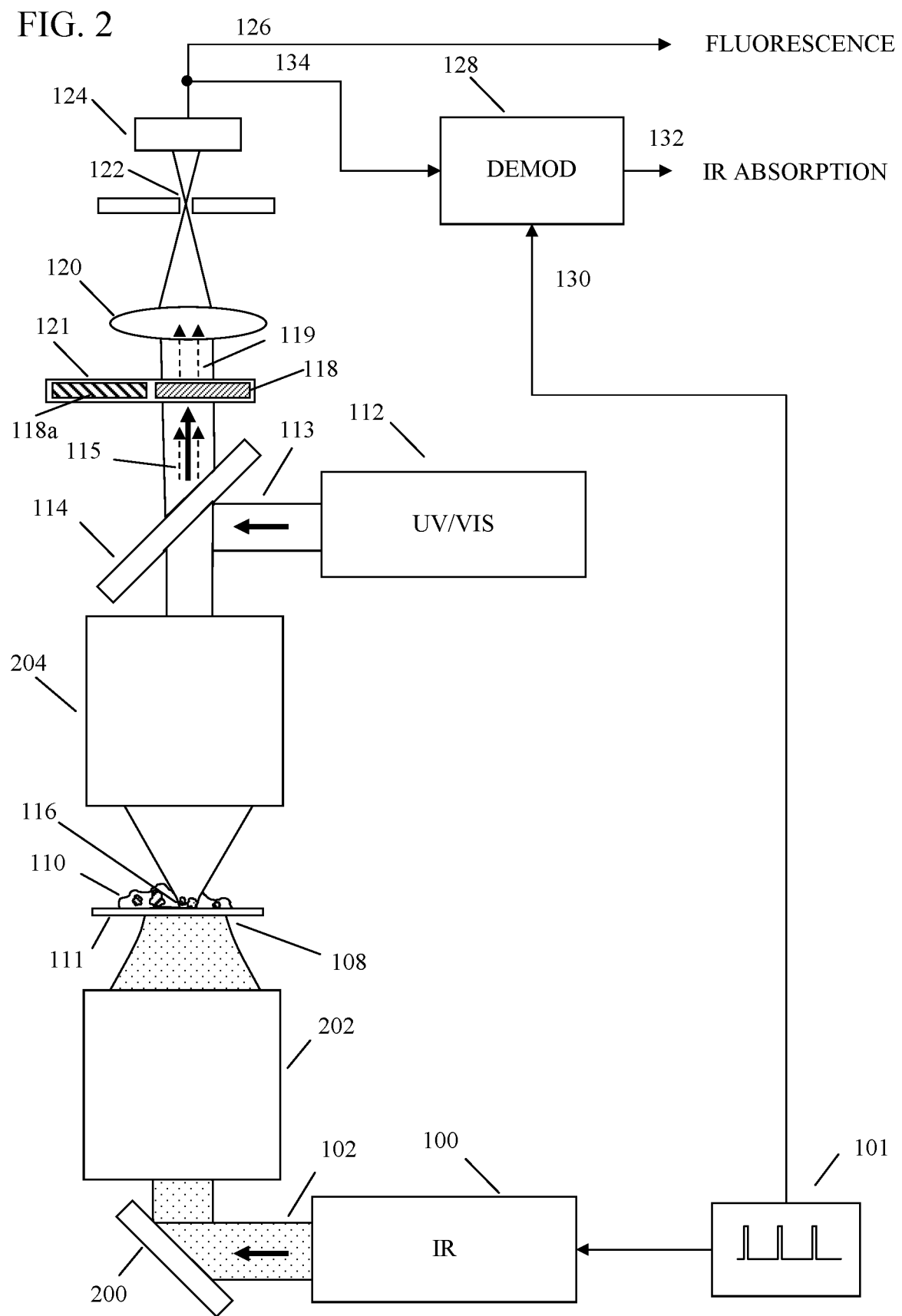

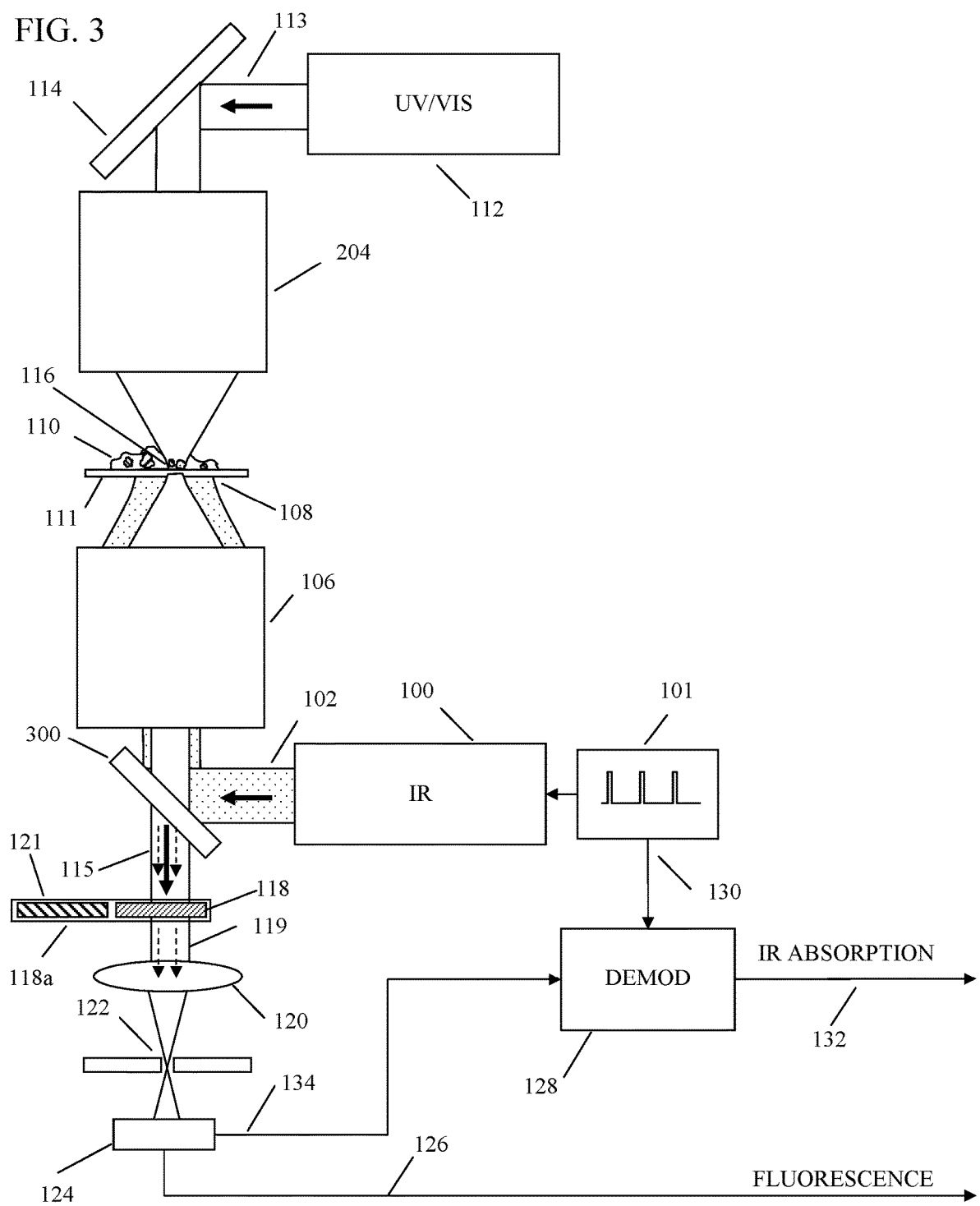

FLUORESCENCE ENHANCED PHOTOTHERMAL INFRARED SPECTROSCOPY AND CONFOCAL FLUORESCENCE IMAGING

RELATED APPLICATION

This application claims the benefit of U.S. Provisional Application No. 63/054,167 filed Jul. 20, 2020, which is hereby fully incorporated herein by reference.

TECHNICAL FIELD

Embodiments disclosed herein generally relate to investigating or analyzing materials using optical systems, i.e. using infrared, visible, or ultraviolet light. Embodiments described herein relate to imaging and spectroscopy, and, more particularly, to enhancements to photothermal imaging and spectroscopy systems and techniques for acquiring spectral information indicative of the optical properties and/or material or chemical composition of a sample, for example, information that correlates to an infrared (IR) absorption spectrum in combination with simultaneous collocated fluorescence imaging.

BACKGROUND

Infrared (IR) spectroscopy is a powerful technique for chemical characterization and analysis of materials, including the mapping and identification of chemical species in complex environments, for example biological materials. Infrared spectroscopy operates by illuminating a sample with a beam of infrared radiation and then measuring the amount of light absorbed, transmitted, reflected and/or scattered from the sample. The frequencies of infrared light, especially mid-infrared light (2.5-20 μm in wavelength) correspond to vibrational frequencies in molecular bonds. Thus, when a sample is illuminated by mid-IR light, it will absorb light at IR radiation frequencies corresponding to specific molecular vibration of chemical species in the sample. By measuring the absorption of IR light by a sample as a function of IR frequency (i.e. an IR absorption spectrum) the pattern of absorption peaks provides a "fingerprint" that can be used to characterize and/or identify chemical species in the sample.

Optical Photothermal Infrared (OPTIR) spectroscopy is an emerging field that provides chemical analysis using infrared spectroscopy with a spatial resolution ten or more times finer than conventional Fourier Transform Infrared (FTIR) spectroscopy. OPTIR achieves higher spatial resolution than conventional IR spectroscopy by using a shorter wavelength "probe beam" to sense photothermal distortions in infrared absorbing regions of the sample. Various OPTIR technique is described, for example, in U.S. Pat. Nos. 9,091,594, 9,841,324, and 10,677,722, as well as U.S. Publ. Patent Appl. Nos. US 2020-0025677 A1 and US 2019-0120753 A1 and U.S. application Ser. No. 16/366,982.

Confocal fluorescence microscopy is a laser-based technique where radiation of one wavelength excites a fluorescent response in a sample that is detected at second wavelength or range of wavelengths. Extensive libraries of fluorescent dyes have been developed to target different functional and structural elements of biological materials, for example cells, tissues, and organisms. Fluorescence microscopy enables researchers and clinicians to create, visualize and analyze micrographs of a sample where each color represents the distribution of specific target structures within the biological material. Various fluorescence microscopy techniques are described, for example in Renz, "Fluorescence Microscopy—A historical and Technical Perspective," *Cytometry Part A*, Vol 83, pp. 767-779 (2013) and Sanderson et al., "Fluorescence Microscopy," *Cold Spring Harb Protoc.* 2014(10): pdb.top071795. doi:10.1101/pdb.top071795.

To date OPTIR spectroscopy and fluorescence microscopy have not been available on the same analytical instrument.

SUMMARY

Embodiments disclosed include methods and apparatus for Fluorescent Enhanced Photothermal Infrared (FE-PTIR) spectroscopy and chemical imaging, which enables high sensitivity and high spatial resolution measurements of IR absorption with simultaneous confocal fluorescence imaging. In various embodiments, the FE-PTIR technique utilizes combined/simultaneous OPTIR and fluorescence imaging that provides significant improvements and benefits compared to previous work by simultaneous detection of both IR absorption and confocal fluorescence using the same optical detector at the same time.

In various embodiments, the techniques provide collocation of the IR absorption and fluorescence measurements, allowing robust correlative comparison of the structural elements visualized by the fluorescence measurements with the chemical analysis by infrared spectroscopy. In various embodiments, the techniques localize the IR absorption measurement to only the regions fluorescently labeled by a specific fluorescent dye, providing both extreme localization of the IR measurement and also better spatial resolution than may be obtained by conventional OPTIR measurements. In some embodiments, the techniques enhance the fractional strength of the photothermal signal by ~100×. In some embodiments, the techniques provide a dramatic reduction in the amount of background probe radiation collected from the sample, resulting in a decrease in noise in the OPTIR measurement.

In embodiments, a method obtaining fluorescence and photothermal infrared measurements from a sample to characterize a chemical composition thereof includes illuminating the sample with an infrared beam to create an infrared illuminated region of the sample, and then illuminating a region of the sample with a probe beam at least partially overlapping the infrared illuminated region of the sample, wherein the probe beam comprises an excitation wavelength that is shorter than the infrared light. Light caused by the probe beam interacting with the sample including fluorescence emission from the probe-beam illuminated region of the sample is collected and filtered to substantially block light at the excitation wavelength and at least partially transmit the fluorescence emission from the probe-beam illuminated region of the sample. A detector detects the fluorescence emission from the probe-beam illuminated region of the sample, and an amount of modulation of detected fluorescence emission is determined in response to infrared absorption by the sample. The amount of modulation of detected fluorescence emission is determined in order to create a signal indicative of IR absorption by the sample, wherein the signal indicative of IR absorption is based on the chemical composition of the sample.

In embodiments, a method obtaining fluorescence and photothermal infrared measurements from a sample to characterize a chemical composition thereof illuminating the sample with a modulated beam of infrared light to create an infrared illuminated region of the sample and then illuminating the sample with a probe beam at least partially overlapping the infrared illuminated region of the sample, wherein the probe beam comprises an excitation wavelength that is shorter than the infrared light and wherein light at the excitation wavelength excites fluorescence emission in the sample. Fluorescent light emitted from a region of the sample illuminated by both the infrared beam and the probe beam is detected and a change in the detected fluorescent light is demodulated synchronously with a period of the modulated beam of infrared light. The demodulated change is used to create a signal indicative of IR absorption of the sample.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIG. 2 is a conceptual simplified block diagram of a microscope system for fluorescence enhanced photothermal infrared spectroscopy and simultaneous confocal fluorescence imaging employing a counter-propagating geometry.

FIG. 3 is a conceptual simplified block diagram of a microscope system for fluorescence enhanced photothermal infrared spectroscopy and simultaneous confocal fluorescence imaging employing a counter-propagating geometry and transmission detection.

Figure 1A:
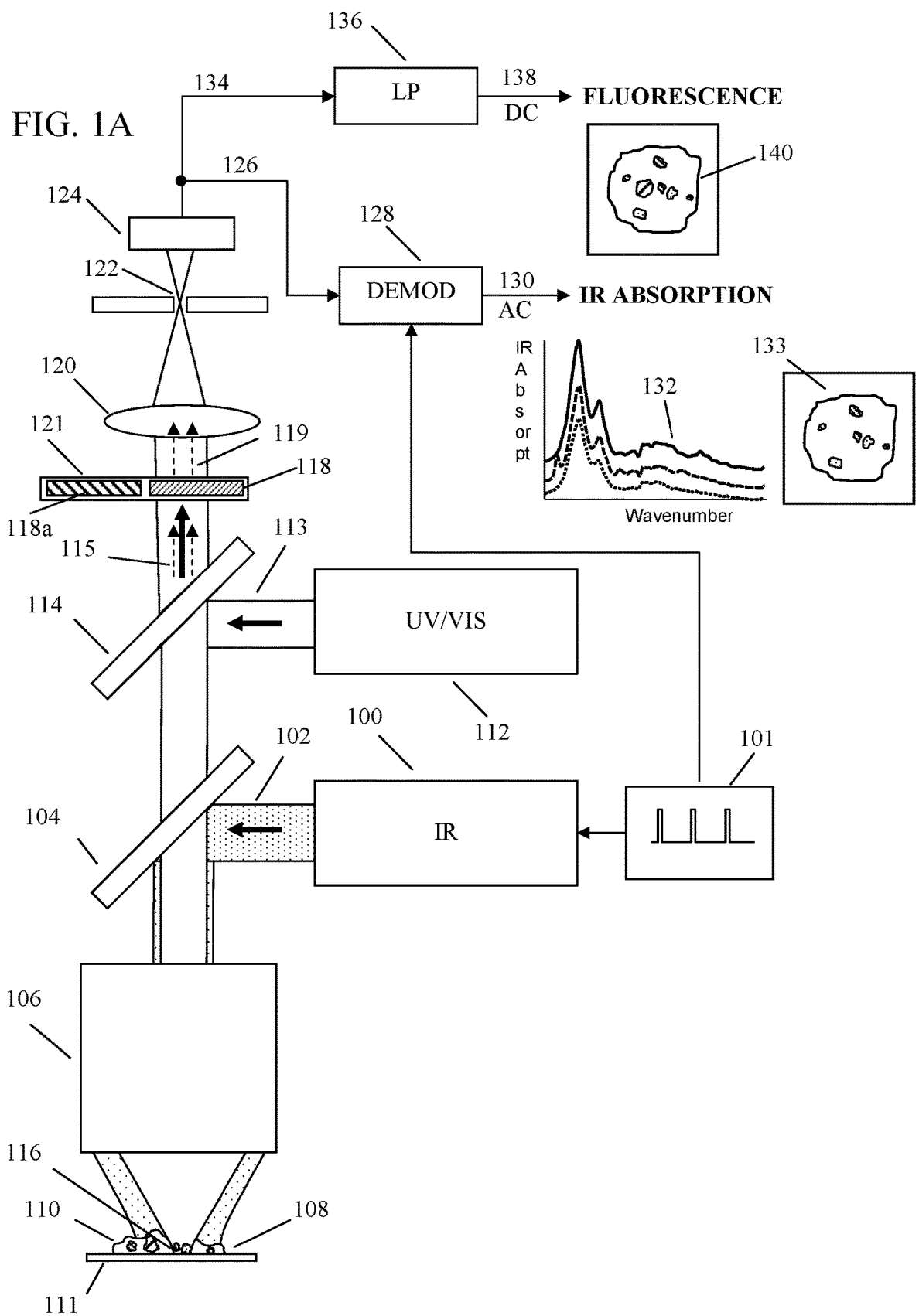
FIG. 1A is a conceptual simplified block diagram of a microscope system for fluorescence enhanced photothermal infrared spectroscopy and simultaneous confocal fluorescence imaging.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Definitions

For purposes of this specification, the following terms are specifically defined as follows:

An "analyzer/controller" refers to a system to facilitate data acquisition and control of the dual probe system. The analyzer/controller may be a single integrated electronic enclosure or may comprise multiple distributed elements. The control elements may provide control for positioning and/or scanning of the fiber probe and/or sample. They may also collect data about the probe beam deflection, motion or other response, provide control over the excitation and/or probe power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs may be implemented along with discrete circuit components to carry out one or more of the processes described herein.

"Beam combiner" means an optical element that can combine two beams onto the same optical path. In one configuration, a beam combiner may be a beam splitter used in a reverse direction, i.e. combining one beam that reflects off of the beam splitter interface with another beam that is transmitted through the beam splitter interface. A beam splitter cube, for example, can be used as both a beam splitter and a beam combiner. Optical elements that are marketed as beam splitters can be used as a beam combiner, even if they are not used to split light onto two paths. For example, a Mach-Zehnder interferometer uses one beam splitter to split incident light onto two paths and a second beam splitter to recombine the two beams. In this case, the second beam splitter is being used as a beam combiner. In a Michelson interferometer, a single beam splitter is used to both divide the incident light and then recombine it. Thus, the beam splitter in a Michelson interferometer as being used as both a beam splitter and a beam combiner. A beam combiner can also be an optical fiber-based device, for example combining the light from two input fibers into one output fiber, for example a 1×2 fiber coupler. A single 1×2 fiber coupler can be used as both a beam splitter and a beam combiner.

"Beam splitter" refers to an optical element that can divide light onto at least two paths. A beam splitter can comprise a plate, a cube and/or a prism or other shapes/configurations that can divide a beam of light. The beam splitter can comprise a thin film that is partially reflecting at the wavelength of interest such that a portion of an incident beam is reflected and another portion is transmitted. A beam splitter may be polarizing, wherein in substantially transmits light of one polarization and reflects light of an orthogonal polarization. A beam splitter may also divide light along two transmission paths based on polarization, for example in the case that the beam splitter is a Nomarski or Wollaston prism. A beam splitter may also be non-polarizing, where light is divided between two paths without substantial dependence on the polarization of the incident light. A beam splitter can also be an optical fiber-based device, for example splitting light from one input optical fiber into at least two output optical fibers, for example a 1×2 fiber coupler. A beam splitter may be a 50:50 beam splitter in which substantially equal fractions of light are directed on two different paths. They can also be unbalanced, for example a 90:10 or 70:30 or similar beam splitter that direction 90% of light on one path and 10% on another, or 70% on one path and 30% on another.

A "camera" refers to an array-based photodetector comprising a plurality of photosensitive pixels. A camera may comprise one or more technology including but not limited to CCD, EM-CCD, CMOS, s-CMOS, and/or other photosensitive array technologies. The camera may support frame rates from a few frames per seconds, hundreds of frames per second, or even thousands of frames per second or higher.

"Collecting probe light" and "collecting probe radiation" refer to collecting radiation of a probe light beam that has interacted with a sample. The probe light can be collected after reflection, scattering, transmission, evanescent wave coupling, and/or transmission through an aperture probe.

"Collimating optic" refers to any of the above optical elements arranged in a way to generally collimate radiation. In some embodiments the same optic(s) may serve as both a focusing optic and a collimating optic, for example focusing light in one direction of propagation and then recollimating the light in the opposite direction of propagation.

"Confocal microscopy" refers to a form of optical microscopy in which the light collected at a detector is confined to light that passes through a small volume within the 3D focus volume of an optical objective on a sample. Confocal microscopy is often performed by placing a "confocal aperture" at a focal plane that is equivalent with the focal plane of the sample, thus blocking stray light that does not pass through the focus volume on the sample.

A "detector" refers to a device that produces a signal indicative of the power, intensity and/or energy of light/radiation incident on the detector surface. The signal will generally be an electrical signal, for example a voltage, current and/or an electrical charge. The detector may be a photodiode, a phototransistor, a charge coupled device (CCD). In some cases, a detector may be a semiconducting detector, for example a silicon PIN photodiode. A detector may also be an avalanche photodiode, a photomultiplier tube, or any other device that produce a change in current, voltage, charge, conductivity or similar upon incidence of light. A detector may comprise a single element, multiple detector elements, for example a bi-cell or quad-cell, a linear or two-dimensional array of detector elements, including camera-based detectors.

"Diffraction limit" of a light beam means the minimum separation of two optical sources that can be distinguished by a detector. The Abbe diffraction limit d for a microscope having a numerical aperture NA and operating at a wavelength $\lambda$ is defined as $d=\lambda/(2 \cdot NA)$. Physical restraints on the numerical aperture of a microscope prohibit very large numerical apertures, and therefore the diffraction limit of a microscope depends strongly upon the operating wavelength used for detection, with large wavelengths corresponding to relatively poor resolution and high wavelengths corresponding to increased precision.

"Demodulate" or "demodulation" refers to extracting an information-bearing signal from an overall signal, usually, but not necessarily at a specific frequency. For example, in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation.

A "demodulator" refers to a device or system that performs demodulation.

"Figure of merit" refers to any metric or indicator of the relative quality of a signal or measurement. The figure of merit can for example be a measurement sensitivity, a signal strength, a noise level, a signal to noise ratio, a background level, a signal to background ratio, any combination of these, or other metric that lets one rank the relative quality of a signal and/or measurement.

"Focusing optic" refers to one or more optical elements with the ability to focus light. A focusing optic can comprise one or more refractive lenses, curved mirrors, diffractive optics, Fresnel lenses, volume hologram, metamaterial, or any combination thereof or any other device or component capable of focusing radiation.

"Fluorescence" refers to the emission of light from a sample at one wavelength due to excitation at another wavelength. Fluorescent excitation and emission processes are a form of inelastic scattering of incident light and can be used to characterize a sample by providing information about the types of fluorescent emissions (number of photons emitted, and wavelength of emitted photons) based on a particular intensity and spectrum of incident light.

"Illuminate," "illuminating," and "illumination" mean to direct radiation at an object, for example a surface of a sample, the probe tip, and/or the region of probe-sample interaction. Illumination may include radiation in the infrared wavelength range, visible, and other wavelengths from ultraviolet to a millimeter or more. Illumination may include any arbitrary configuration of radiation sources, reflecting elements, focusing elements and any other beam steering or conditioning elements.

"Infrared absorption spectrum" refers to a spectrum that is proportional to the wavelength dependence of the infrared absorption coefficient, absorbance, or similar indication of IR absorption properties of a sample. An example of an infrared absorption spectrum is the absorption measurement produced by a Fourier Transform Infrared spectrometer (FTIR), i.e. an FTIR absorption spectrum. In general, infrared light will either be absorbed (i.e., a part of the infrared absorption spectrum), transmitted (i.e., a part of the infrared transmission spectrum), or reflected. Reflected or transmitted spectra of a collected probe light can have a different intensity at each wavelength as compared to the intensity at that wavelength in the probe light source. It is noted that a IR measurements are often plotted showing the amount of transmitted light as an alternative to showing the amount of light absorbed. For the purposes of this definition, IR transmission spectra and IR absorption spectra are considered equivalent as the two data sets as there is a simple relationship between the two measurements.

"Infrared source" and "source of infrared radiation" refer to one or more optical sources that generates or emits radiation in the infrared wavelength range, generally between 2-25 microns. The radiation source may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), interband cavity lasers (ICLs), synchrotron infrared radiation sources, nanosecond, picosecond, femtosecond and attosecond laser systems, CO2 lasers, microscopic heaters, electrically or chemically generated sparks, and/or any other source that produces emission of infrared radiation. The source emits infrared radiation in a preferred embodiment, but it can also emit in other wavelength ranges, for example from ultraviolet to THz. The source may be narrowband, for example with a spectral width of <10 cm$^{-1}$ or <1 cm$^{-1}$ less, or may be broadband, for example with a spectral width of >10 cm$^{-1}$, >100 cm$^{-1}$ or greater than 500 cm$^{-1}$. Broadband sources can be made narrow band with filters, monochromators and other devices. The infrared source can also be made up of one of discrete emission lines, e.g. tuned to specific absorption bands of target species.

"Interacting" in the context of interacting with a sample means that light illuminating a sample is at least one of scattered, refracted, absorbed, aberrated, diverted, diffracted, transmitted, and reflected by, through and/or from the sample.

A "lock-in amplifier" is one example of a "demodulator" (defined above) and is a device, system, and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high speed rotating mirror devices. Modulation can also be accomplished with devices that provide time varying transmission like acousto-optic modulators, electro-optic modulators, photo-elastic modulators, pockel cells, and the like. Modulation can also be accomplished with diffraction effects, for example by diffractive MEMS-based modulators, or by high speed shutters, attenuators, or other mechanisms that change the intensity, angle, and/or phase of the laser intensity incident on the sample.

"Near infrared light" generally refers to a wavelength range of infrared (IR) light corresponding to 0.75-2 μm.

A "narrowband light source" a light source with a narrow bandwidth or linewidth, for example a light of linewidth smaller than 8 cm-1, but in general it can be a light source with a linewidth narrow enough that the linewidth does not cover a spectral range of interest of the sample.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light or other response of a material due to the interaction with illuminating radiation.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with a probe beam.

A "probe source," "probe light source," or "probe radiation source" refer to a radiation source that can be used for sensing of an optical property of a sample. A probe light source can be used to sense the response of the sample to the incidence of light from the infrared light source. The radiation source may comprise a gas laser, a laser diode, a superluminescent diode (SLD), a near infrared laser, a UV and/or visible laser beam generated via sum frequency or difference frequency generation, for example. It may also comprise any or other sources of near-infrared, UV, and/or visible light that can be focused to a spot on the scale smaller than 2.5 micrometer, and or even smaller than 1 micrometer, and possibly smaller than 0.5 micrometer. In some embodiments, the probe light source may operate at a wavelength that is outside the tuning or emission range of the infrared light source, but the probe light source can also be a fixed wavelength source at a select wavelength that does in fact overlap with the tuning range of the infrared light source. A "probe light beam" or "sensing light beam" is a beam originally emitted from a probe light source.

"Probe beam" is a beam of light or radiation that is directed onto a sample to detect a photothermal distortion or other optical change resulting from the interaction of IR radiation with the sample, for example to detect the absorption of IR radiation by the sample.

"Raman" refers to light that is inelastically scattered from a sample at one or more wavelengths that are different from the excitation wavelength due to Raman scattering. "Raman spectroscopy" refers to measuring the spectroscopic content (Raman spectra) of Raman scattered light, for example the intensity of Raman scattered light as a function of Raman shift. "Raman spectrometer" is a device for examining Raman shifts in light collected from a sample and producing Raman spectra and/or Raman images.

A "retarder" refers to an optical element that induces a relative optical phase delay in an optical path. Examples of retarders are wave plates, for example half wave plates, quarter wave plates and eight wave plates. One or more retarders/wave plates can be used to introduce an optical phase difference between two polarizations of light, for example to introduce a phase difference between two paths of a quadrature interferometer.

"Signal indicative of" refers to a signal that is mathematically related to a property of interest. The signal may be an analog signal, a digital signal, and/or one or more numbers stored in a computer or other digital electronic device. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

"Spectrum" refers to a measurement of one or more properties of a sample as a function of wavelength or equivalently (and more commonly) as a function of wavenumber.

The terms "about" or "approximate" and the like are synonymous and are used to indicate that the value modified by the term has an understood range associated with it, where the range can be ±20%, ±15%, ±10%, ±5%, or ±1%.

The term "substantially" is used to indicate that a result (e.g., measurement value) is close to a targeted value, where close can mean, for example, the result is within 80% of the value, within 90% of the value, within 95% of the value, or within 99% of the value.

Fluorescent Enhanced IR Spectroscopy with Simultaneous Confocal Fluorescence Imaging FIG. 1A shows a simplified schematic diagram of a microscope for fluorescent enhanced IR spectroscopy with simultaneous confocal fluorescence imaging. An infrared source 100 emits a beam of infrared (IR) radiation 102 that is directed toward dichroic mirror 104 or other beam combiner towards focusing optic 106. Focusing optic 106 may be a microscope objective 106, for example a reflective objective of a Schwarzschild or related design. Focusing optic 106 may also be an off axis parabolic mirror, refractive objective, or any other optical assembly capable of focusing IR light. Focusing optic 106 creates a focused spot or region of IR radiation 108 on sample 110. Sample 110 may optionally be mounted on a sample substrate 111. Depending on the embodiment sample substrate may be transparent to at least one of IR or UV/visible light or in the embodiment of FIG. 1 may also be reflective or opaque. Sample 110 may comprise one or more biological specimen for example a biological cell, tissue, and/or organism. In embodiments, the sample 11 comprises regions that are fluorescently labeled using one or more fluorescent dyes and/or tags. Sample 110 may alternately include regions of autofluorescence, i.e. regions that fluoresce naturally without addition of artificial fluorescent markers. IR beam 102 is periodically modulated, either directly using a pulsed/modulated IR source or via an external chopper/modulator. A modulation controller 101 can generate a pulse train, sinusoid or other modulation control signal that is used to synchronize or gate the IR beam 102 from IR source 100, in various embodiments.

IR source 100 may be a tunable IR source or a broadband IR source. When the beam emitted by IR source 100 contains at least one wavelength that corresponds to an absorption band within the sample, the IR absorbing regions of the sample will heat up with each IR pulse or over each IR modulation cycle. A probe beam is used to read out IR absorption of the sample by detecting photothermal distortions in the sample due to an increase in temperature from IR absorbing regions of the sample/specimen. Specifically, UV/VIS source 112 emits one or more probe light beams 102 comprising at least one wavelength that is shorter than the wavelength(s) of the IR beam. UV/VIS source 112 may be configured to emit at multiple UV and/or visible wavelengths either simultaneously and/or sequentially, e.g. selected to excite different fluorophores in the sample/specimen. Probe beam 102 is reflected off dichroic mirror 114 and optionally directed to focusing optic 106, i.e. the same microscope objective used to focus the IR light beam. The probe beam may alternately be directed at the sample from the other side of the sample, e.g. in a counterpropagating geometry using a separate focusing optic (not shown). This counterpropagating approach is described, for example, in U.S. Pat. No. 10,677,722 B2, the contents of which are incorporated by reference herein in their entirety The probe beam can also be directed to the sample using an alternate focusing optic on the same side of the sample as described in U.S. Publ. Appl. No. US 2019-0120753 A1, the contents of which are incorporated by reference herein in their entirety.

IR absorbing regions of the sample/specimen can photothermal distortions in the sample resulting from localized heating of the IR absorbing regions. These photothermal distortions in the sample can result in the intensity, phase, angular distribution, or other optical properties of the probe beam after it interacts with IR absorbing regions of the sample. By collecting and detecting at least a portion of probe light after it has interacted with the sample, (e.g. reflected, and/or scattered from the sample and/or transmitted through the sample), it is possible to construct a signal indicative of IR absorption of the portion of the sample/specimen illuminated by the probe light.

Since the probe beam has a shorter wavelength than the IR beam, the probe beam can be focused to a probe beam spot 116 that is much smaller than the corresponding IR spot size 108. The smaller size of probe beam spot 116 results in better spatial resolution of the IR absorption than if measured using the IR beam alone. In practice it is possible to achieve at least an order of magnitude improvement in spatial resolution using a UV or visible probe beam as compared to the resolution that would be achieved with a traditional infrared microscope operating in the mid-IR. E.g. using a probe beam of 633 nm would achieve a spatial resolution of 10× better than a mid-IR wavelength of 6.33 μm with the same numerical aperture focusing optic. Use of shorter visible wavelengths like 532 nm or 488 nm, or UV wavelengths like 405 nm or 355 nm can achieve even higher spatial resolution benefits.

The embodiment shown in FIG. 1A, however, provides an additional benefit for further improving the spatial resolution through fluorescence localization. Probe light collected from the sample 115 may contain multiple wavelengths, for example light at the original probe excitation wavelength (indicated by the heavy arrow), but also wavelength shifted light due to sample fluorescence or due to Raman scattering. Wavelength shifted light is indicated by the dashed arrows. An exchangeable blocking filter 118 is placed in the beam path to block the probe beam at the original excitation wavelength, passing at least a portion of wavelength shifted light.

Fluorescence Localization of Photothermal IR Absorption Measurement

Figure 1B:
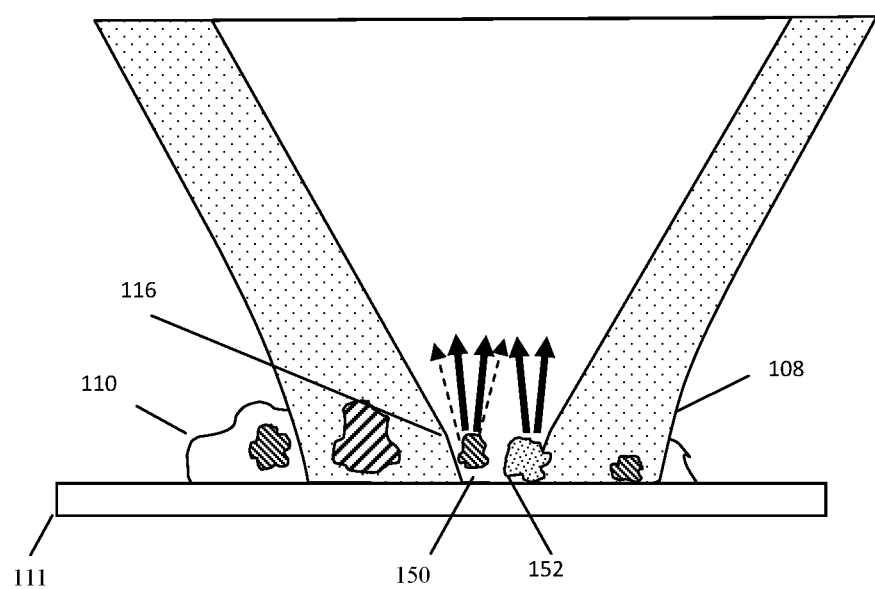
FIG. 1B is an enlarged view of a portion of FIG. 1A.

The benefit of the use of blocking filter 118 is illustrated in FIG. 1B. FIG. 1B shows an enlarged view of the region of FIG. 1A comprising the sample 110, specimen 111, and IR and probe beams 108 and 116. Consider a specimen 111, for example a biological cell, with different internal components (e.g. organelles) that have been labeled with different fluorophores. These are indicated schematically by fluorescently labeled bodies 150 and 152 where the difference in shading indicates a difference in the fluorophores used to tag the different bodies. Light emitted from these bodies 150 and 152 will include both probe light at the original probe beam wavelength (indicated by dark arrows) and wavelength shifted light indicated by lighter dashed arrows. If the probe beam wavelength is selected to correspond to an excitation wavelength of the fluorophores labeling body 150, but not the fluorophores labeling body 152 (or if body 152 is unlabeled) then fluorescent light will substantially only be emitted from body 150. When the probe light is collected from sample 110, it will contain light reflected/scattered/emitted from the volume of the specimen illuminated by probe beam 116 and thus any IR absorption measurement performed using the unfiltered probe beam from this region will be an amalgam of the IR absorption of all objects in the focal volume of the probe beam. So if an unfiltered probe beam was used to generate a signal indicative of the IR absorption for probe beam illuminated spot 116, the resulting IR absorption measurement would be a superposition of the IR absorption of body 150, along with body 152 as well as any surrounding cell wall and cell media.

The inclusion of blocking filter 118, however, provides a significant improvement in spatial resolution of the photothermal measurement as it will only permit passage of the wavelength shifted fluorescent light 119. Thus, in the example of FIG. 1B, the filter 118 will only pass fluorescent light emitted from body 150. But the fluorescent light emitted/collected from body 150 also still contains the imprint from IR absorption of body 150. That is, periodic IR absorption by body 150 will cause a corresponding periodic change in the intensity, angular distribution and/or phase of the fluorescent light emitted from body 150. Thus, by analyzing the periodic changes in the collected fluorescent light, it is possible to perform IR absorption measurements on length scales even smaller than the size of focused probe beam 116.

That is, the benefit of the system shown in FIG. 1A and FIG. 1B is that it accomplishes the spatial resolution of an OPTIR system with the chemical compound characterization of a fluorescence detection system at resolutions more precise that were previously possible.

One or more mechanisms can lead to a photothermal signal being present in the fluorescent wavelength shifted light. First, heating from IR absorption can cause both small changes in the physical size of the IR absorbing object as well as a shift in the index of refraction, thus changing the intensity and/or angular distribution of light scattering from the fluorescent object.

Emission Efficiency of Fluorescent Dyes can have a Large Temperature Dependence.

Additionally, the quantum yield of fluorescent dyes commonly used in the life sciences also have a temperature dependence and can generate a large change in measured fluorescent intensity with IR induced heating. See for example "Emission Characteristics of Fluorescent Labels with Respect to Temperature Changes and Subsequent Effects on DNA Microchip Studies" by Liu et al in Applied And Environmental Microbiology, October 2005, p. 6453-6457 (doi:10.1128/AEM.71.10.6453-6457.2005) and "Temperature measurement in the microscopic regime: a comparison between fluorescence lifetime- and intensity-based methods" by C. Paviolo et al Journal of Microscopt, 22 Mar. 2013 (https://doi.org/10.1111/jmi.12033) and "Application of Temperature-Dependent Fluorescent Dyes to the Measurement of Millimeter Wave Absorption in Water Applied to Biomedical Experiments" by Kuzkova et al, International Journal of Biomedical Imaging, November 2014 (https://doi.org/10.1155/2014/243564). Both the Liu and Kuzkova publications, which are incorporated as Appendix A hereto, show that certain fluorescent dyes can have a very large temperature dependence on the emission efficiency. For example, both publications show Rhodamine red having roughly a 10% change in emission efficiency with a 10° C. temperature change near room temperature. This corresponds to roughly a fractional change in intensity of about 0.01/° C. This factor is about two orders of magnitude higher than the traditional photothermal change of about $10^{-4}/°$ C. for thermal expansion and index of refraction change with temperature. In embodiments, fluorescence enhanced OPTIR can provide sensitivity improvements of ~100× as compared to photothermal measurements alone. Fluorescent dyes can also be engineered to enhance this effect by engineering a transition temperature in the dye around room temperature or body temperature. Significant temperature effects are also observed in autofluorescence emission of tissue. See for example "Variation Of Fluorescence With Temperature In Human Tissue," the Masters thesis of Daniel Barton Masters at Vanderbilt University, May 2010, also included in Appendix A.

Simultaneous Resolution Enhanced IR and Fluorescence Imaging

Referring back to FIGS. 1A and 1B, collected fluorescent light that passes through barrier filter 118 to detector 124 is then analyzed in two different ways to provide simultaneous and collocated measurements of fluorescence and IR absorption. A signal from detector 124 is sent on a first path 126 where it is demodulated by demodulator 128 to produce a signal 130 that is indicative of an AC modulation of the collected fluorescent light. In one embodiment demodulator 128 can for example be a lock-in amplifier and the AC signal 130 can be an amplitude, phase, in-phase or quadrature signal, or any synchronous measurement of an AC modulation of the fluorescent light. For example, using a reference signal 130 from modulator 101 it is possible to perform a high sensitivity measurement of AC modulation of the fluorescence signal in sync with the modulation of the IR beam 102.

This AC modulation of the fluorescent light is due to change in fluorescent emission from the absorption of IR light. This AC modulation is hence a signal indicative of the amount of IR absorption by the region of the sample from which the fluorescent light is collected. By measuring the signal indicative of IR absorption as a function of wavenumber of the IR beam 102, it is possible to create IR absorption spectra 132 that can be used to chemically characterize the chemical components in the sample. By mapping the signal indicative of IR absorption as a function of position on the sample, it is possible to create an IR chemical map/image 133 that shows the distribution and relative density of chemical species that absorb at one or more IR absorption bands (i.e. at one or more wavenumbers of the IR beam.) Demodulation of the IR induced modulation in fluorescent emission can be achieved with other synchronous and asynchronous methods, including techniques like high pass/notch filter with rectification, an RMS-to-DC converter, a resonant amplifier or other techniques to produce a signal indicative of a modulation of the collected fluorescent light from IR absorbing and fluorescently emitting areas of a sample. This demodulated signal in turn will be indicative of IR absorption by the regions of the sample that are both (1) absorbing IR radiation; and (2) emitting fluorescent light. This combination provides great specificity and localization to the IR absorption measurement, as well as significant enhancement of the relative signal strength. Fluorescence enhanced IR absorption spectra 132 can be created by measuring an AC modulation of the detected fluorescence radiation as a function of the wavelength of IR beam 102, e.g. by tuning the center wavelength of IR source 100. Or if IR source is a broadband IR source, for example a supercontinuum laser or a thermal IR source, then IR spectra can be obtained using interferometric techniques such as those used in a Fourier Transform Infrared (FTIR) spectrometer.

A signal from detector 124 is also sent on a parallel path 134 that is used to make a measurement of the fluorescent emission intensity over one or more fluorescent emission bands. The signal from photodetector 124 can be optionally filtered, for example by a low pass filter 136 or other filtering technique to create a "DC" signal indicative of the time averaged fluorescent light collected from the region of the sample illuminated by the probe beam. By mapping this DC fluorescence signal as a function of position over the sample, it is possible to make a map or image 140 of the distribution of fluorescent tags and/or autofluorescent regions of a sample. Measurements of DC fluorescent intensity can be performed with a plurality of excitation wavelengths and/or emission wavelengths to produce overlay fluorescent images showing for example the distribution of different fluorophores thus mapping the distribution of different structural elements for example in a biological specimen.

Fluorescent image 140 may have substantial similarities to IR chemical image 133 in that both can map the distribution of different chemical species. But the contrast mechanisms are different—the fluorescent image maps the relative concentration of fluorescent tags or autofluorescence in a region of a sample stimulated by a given excitation, whereas the IR image maps the strength of IR absorption at a given wavenumber for fluorescing regions of the sample. Note that it is also possible to remove filter 118 from the collection beam path to make IR absorption images/spectra that will include signal from non-fluorescent regions as well. It is also possible to perform time dependent measurements of fluorescence, for example using a pulsed UV/VIS source, for example for fluorescent lifetime measurements or time dependent bleaching measurements, etc. In this case the fluorescent signal is not a "DC" signal but instead would be demodulated synchronously with the pulses of the UV/VIS light source. The IR source and UV/VIS source can be modulated at different frequencies to provide clear separation as to the source of changes in fluorescent intensity. For example, the UV/VIS source modulation can be set at an integer multiple of the IR source modulation or vice versa. Alternately, the two modulations can be performed in substantially different frequency regimes, for example modulating the IR source in the 100 kHz regime and the UV/VIS source in the tens of MHz regime.

Images of fluorescent intensity 140 and IR absorption 133 as a function of sample position can be made by measuring fluorescence and IR absorption signals at a plurality of sample positions, e.g. by moving the sample under stationary IR and UV/VIS beams, and/or by scanning the position of at least the UV/VIS beam across a stationary sample, or a combination thereof. Scanning of the UV/VIS beam can be accomplished for example using galvo scanners common in laser scanning confocal microscopes or even spinning disk confocal scanners.

Blocking filter 118 can be a fluorescence emission filter, a pass band filter, and edge filter a diffraction grating in combination with a slit, an acousto-optical tunable filter, or any other passive or active optical element(s) configured to substantially block at least a majority of the original excitation wavelength of the probe beam while passing at least a portion of wavelength shifted light. In the case of fluorescence, for example, the wavelength of the fluorescent light will be shifted to longer wavelengths, so a long pass filter can be used or a band pass filter covering a higher wavelength range than the probe beam. The exchangeable blocking filter can be selected to optimally pass light emitted by a specific target fluorophore, or selected to optimally pass a specific range of autofluorescence. Blocking filter may be readily exchanged to choose a different wavelength range corresponding to different fluorophores used in fluorescent labeling of the specimen. For example, multiple blocking filters 118 and 118a may be placed in a filter changer 121 to provide for easy swapping between measurement of different fluorophores. Filter changer 121 may be for example a filter slide, a filter wheel, a carousel, or any other mechanism that allows ready exchange of blocking filters. It may be desirable to leave one slot in the filter changer 121 open, such that unattenuated probe light can be measured, as per previous OPTIR instruments. It is also possible to use multiple dichroic/blocking filters and multiple detectors simultaneously to simultaneously record the fluorescence response from multiple fluorescent dyes if desired (see FIG. 5).

Measurements of IR induced modulation in fluorescent emission may also be determined in the time domain, for example measuring the fluorescent intensity at detector 124 with the IR beam on versus with the IR beam off. In this case the IR on vs off difference signal will be a signal that is indicative of IR absorption by the sample. It is also possible to simply measure the DC fluorescence intensity as a function of wavelength of the IR beam as there will be DC changes in the fluorescence intensity resulting as a function of the sample temperature associated with the amount of IR absorption at each wavelength.

Measurements in the time domain can be especially useful when the probe beam is pulsed, gated, chopped or otherwise modulated. This may be desirable for example to limit potential fluorophore bleaching. In this case it can be desirable to pulse the probe beam such that it only strikes the sample for a brief period proximate to the timing of pulses from the IR source. For example, it may be desirable to pulse the probe beam to start just at the end of the IR pulse, or overlap a portion of the time the IR pulse is on.

FIG. 2 illustrates a simplified schematic diagram of an embodiment of fluorescence enhanced photothermal infrared spectroscopy using a counter propagating geometry. FIG. 2 is based on FIGS. 1A and 1B, and when identical numerical callouts are used, the description associated with FIGS. 1A and 1B applies as appropriate. In FIG. 2, however, the IR beam 102 and the probe beam 113 are incident from opposite sides of the sample 110 (i.e., they are "counter propagating").

In the embodiment shown in FIG. 2, IR beam 102 is emitted from IR source 100 and optionally reflected off mirror or dichroic 200 where it is then focused by focusing optic 202 onto sample 110. In this case focusing optic 202 can be chosen to be optimized to focusing of IR light, whereas focusing optic 106 can be optimized for focusing/collecting/imaging visible light and specifically the wavelength(s) of UV/VIS source 112 and the resulting fluorescent emissions from the sample/specimen 110/111. Focusing optic 202 may for example be a reflective objective of a Schwarzschild or similar design, an off-axis parabolic mirror, a refractive objective made of IR transparent material(s) or any similar optic capable of focusing IR light. Focusing optic 204 is used to focus and collect UV/visible light, including the incident probe light 113 as well as any fluorescence emission from the sample. Focusing optic 204 may be a high quality, high numerical aperture refractive object such as those commonly used for fluorescence microscopy. In particular focusing optic 204 may be chosen to have good performance at wavelengths corresponding to fluorescence excitation and emission wavelengths, and thus may include optical components that are UV transmissive (in the case of a refractive objective) or UV reflective (in the case of a reflective objective). In this configuration, if a sample substrate 111 is employed, it may be desirable to select a material with high IR transmissibility, though the substrate need not be transmissive to UV/visible light since the fluorescence emission is collected in a backscatter configuration. Optic 200 can be a simple fixed mirror, an adjustable mirror, an electronically controllable mirror like a galvo or fast steering mirror to provide relative adjustment of the overlap between the focus spots of the visible and IR beams.

Optic 200 can additionally or alternately be a dichroic mirror to permit visible illumination from below the sample, i.e. reflective for IR light and transmissive to at least a desired range of visible light.

FIG. 3. illustrates a simplified schematic diagram of an embodiment of fluorescence enhanced photothermal infrared spectroscopy using a counter propagating geometry and transmission detection. FIG. 3 is based on FIGS. 1-2 and when identical numerical callouts are used, the descriptions associated with FIGS. 1-2 applies as appropriate. FIG. 3 is similar to FIGS. 1A, 1B, and 2, except that the detection of fluorescence emission and fluorescence enhanced IR absorption is performed after the probe light has passed through the sample/specimen 110/111. This arrangement can be desirable when the sample or specimen has low reflectivity to visible light and/or when the forward scattering path is more efficient for fluorescence collection. In the embodiment shown, dichroic 300 is selected to be reflective for IR wavelengths and transmissive for wavelengths corresponding to fluorescent emission by the sample and optionally also transmissive to the probe beam. Dichroic 300 may also be chosen to be reflective or absorptive to the excitation wavelength of the probe beam source, thus eliminating the need for the blocking filter 118. In this case focusing optic 204 may be optimized for focusing of UV/visible light and focusing optic 106 is used to both focus the IR light and collect fluorescent emission from the sample 110.

Figure 4:
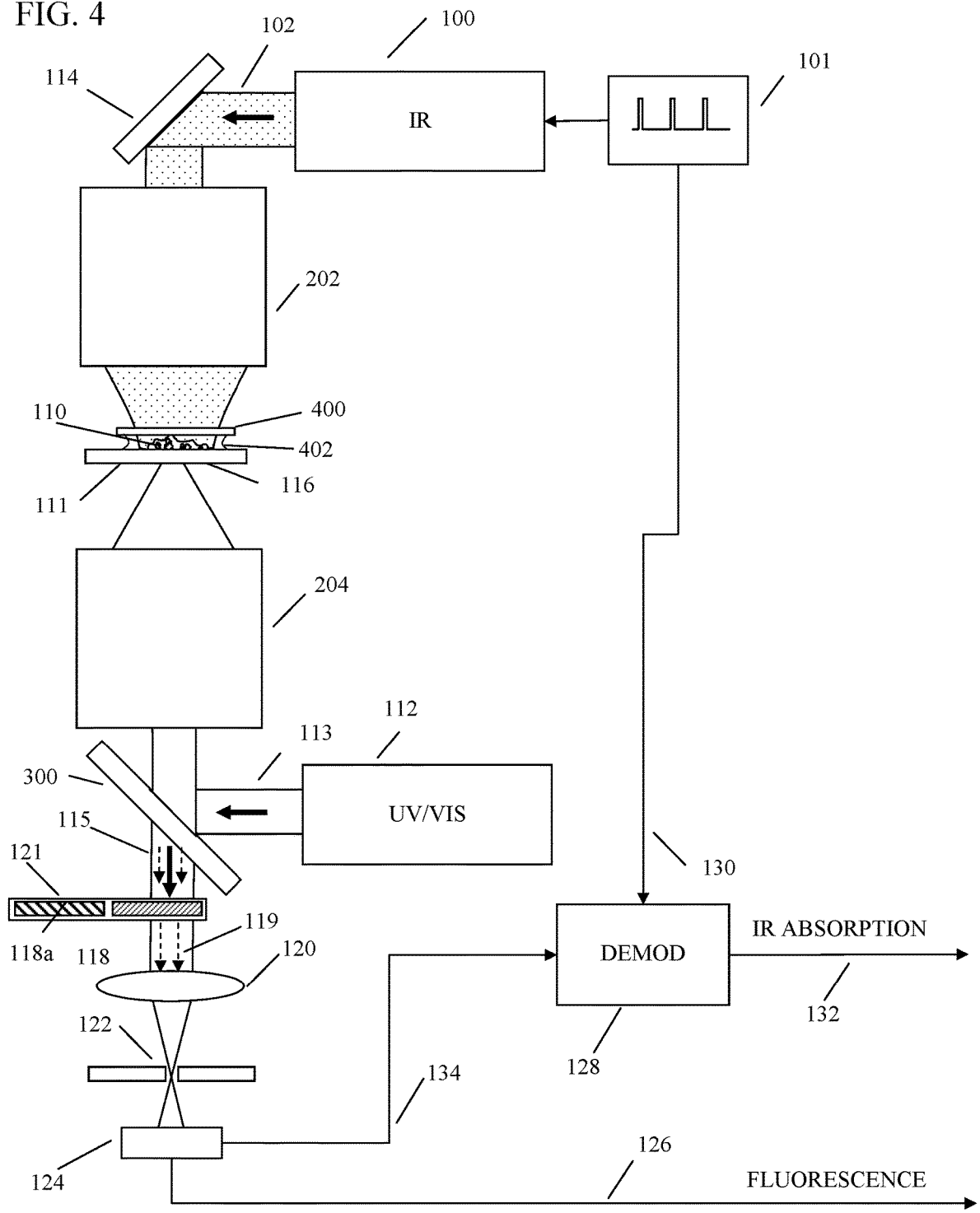
FIG. 4 is a conceptual simplified block diagram of a microscope system for fluorescence enhanced photothermal infrared spectroscopy and simultaneous confocal fluorescence imaging employing a counter-propagating geometry with an inverted optical microscope configuration.

The embodiments shown in FIGS. 2-3 has the IR light coming from below the sample and the UV/VIS probe light coming from above the sample, a configuration similar to a traditional upright optical microscope where a refractive microscope objective is placed above the sample. This configuration can be readily inverted such that the UV/VIS light comes from under the sample and the IR light comes from above. FIG. 4 shows such an inverted configuration that can then be compatible with the setup of conventional inverted optical microscopes that are commonly employed in cell biology and other biological research. FIG. 4 is based on FIGS. 1-3 and when identical numerical callouts are used, the descriptions associated with FIGS. 1-3 applies as appropriate. In the embodiment of FIG. 4 the IR light 102 from IR source 100 is delivered to sample 110 from above the sample via focusing optic 202, whereas the UV/visible light 113 is delivered to the sample from below via focusing optic 204.

This arrangement is advantages for a few reasons. First, sample substrate 111 need not be IR transparent and can in fact be a conventional glass slide, cover slip or petri dish, as used commonly in cell biology. The sample substrate 111 should however be transmissive to the wavelengths of interest of the UV/VIS source 112 as well as any fluorescent emission wavelengths of the sample that are of interest. It is also possible to perform measurements of fluorescence-enhanced photothermal IR spectroscopy with the sample under fluid, for example an aqueous buffer solution. This can be achieved by using a thin IR transparent cover glass 400 on top of sample 110 and sample substrate 111 with a thin layer of liquid 402 in between. It is also possible to support larger thicknesses of liquid, for example by adhering the specimen to the bottom of the cover glass 400, thus eliminating the need to transmit IR light through the liquid and avoiding any IR absorption associated losses. It is also possible to mount the sample/specimen in sealed fluid cell to prevent evaporation of liquid and/or a perfusion cell to allow for the exchange of fluid/nutrients, etc.

Figure 5:
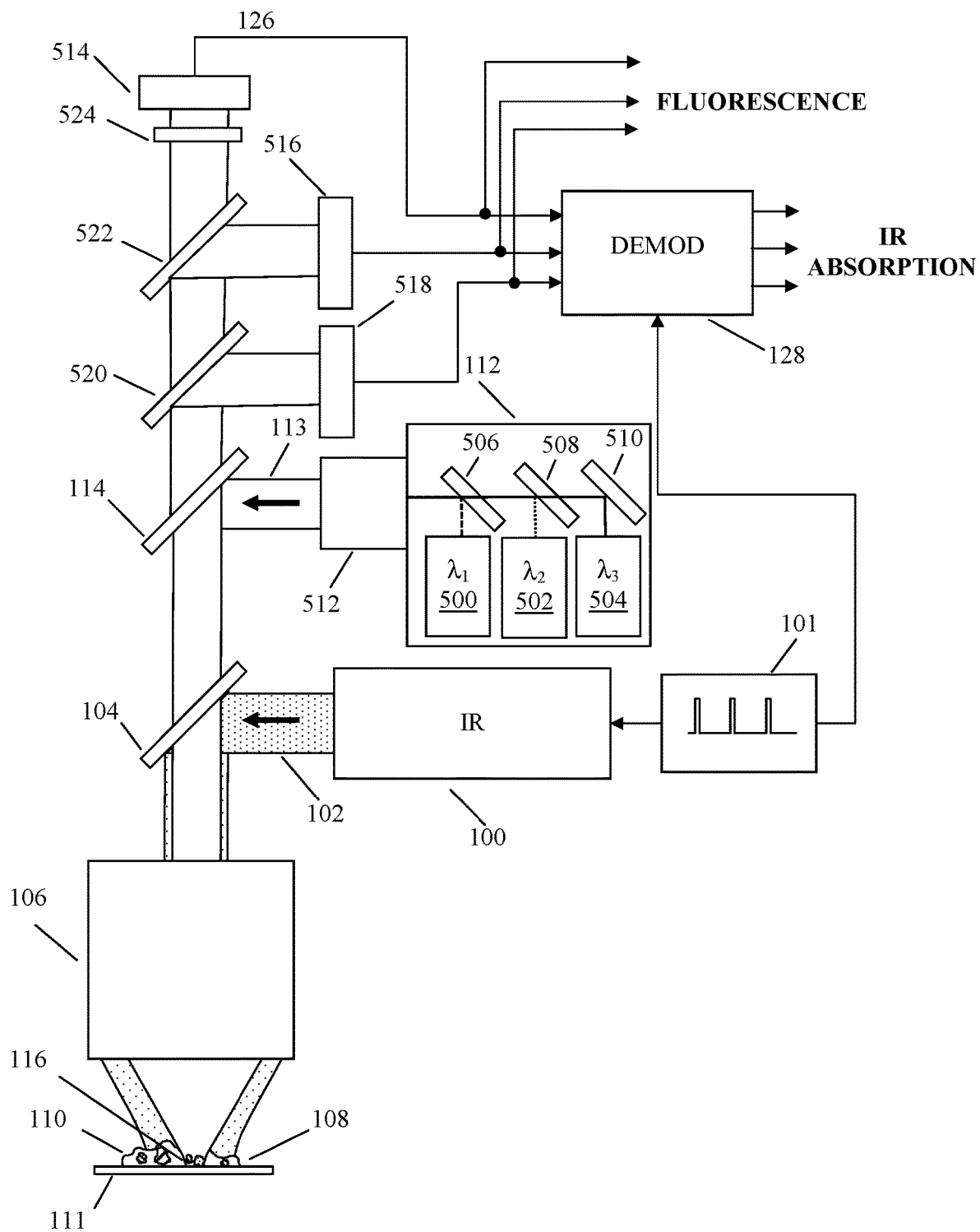
FIG. 5 is a conceptual simplified block diagram of a microscope system for fluorescence enhanced photothermal infrared spectroscopy and simultaneous confocal fluorescence imaging with multi-line laser excitation and multi-line fluorescent detection.

FIG. 5 illustrates an embodiment employing simultaneous or sequential multi-line fluorescence and fluorescent enhanced photothermal IR measurements. FIG. 5 is based on FIG. 1 and when identical numerical callouts are used, the descriptions associated with FIG. 1 applies as appropriate. In FIG. 5, the UV/VIS source 112 comprises a plurality of UV/VIS sources 500, 502, 504 that emit at different center wavelengths $\lambda_1$, $\lambda_2$, and $\lambda_3$, etc corresponding to different excitation wavelengths of fluorescent tags and/or intrinsic autofluorescence of interest. Alternately, UV/VIS source may be a supercontinuum laser that emits light over a range of wavelengths and may be combined with one or more narrow band filters, including variable tunable filters. In the case of discrete UV/VIS sources shown, dichroic mirrors 506 and 508 can be used to combine the beams from sources 500, 502, 504 onto the same optical path. (Element 510 can be a simple mirror.) Note that the discrete UV/VIS sources may also be remote from the microscope system and fiber coupled into the microscope in which case the dichroic mirrors 506 and 508 are combining beams from the output of optical fibers rather than directly from a light generating source like a laser diode. The combined UV/VIS beams can optionally be directed to a beam conditioning/scanning unit 512, where the beams can be expanded, filtered, and/or attenuated as desired. Unit 512 may also contain optomechanics to provide beam scanning, e.g. one or more galvo scanners, scan lenses, etc. UV/VIS source 112 may also include shutters and or flipper mirrors to enable/disable emission from one of more of the individual UV sources 500, 502, 504 from exiting the integrated UV/VIS source 112.

After one or more UV/VIS beams leave the beam conditioning/scanning unit 512, the apparatus operates in a fashion similar as described in FIG. 1, except that the sample can be excited at more than one wavelength at once. In turn, fluorescent emission may occur over a plurality of different wavelengths. To accommodate this, multiple detectors 514, 516, and 518 are provided along with appropriate dichroic filters 520 and 522 to divert fluorescent light of a desired wavelength range to detectors 516 and 518, as well as an optional blocking filter 524 to further filter any light passing through filters 520 and 522 that is not in the range of interest for measurements at detector 514. If desired dichroic filters 520 and 522 and blocking filter 524 may be exchangeable and/or tunable to accommodate the fluorescence from different fluorescent dyes. As with FIGS. 1A and 1B, the outputs from detectors 514, 516, and 518 travel on two parallel paths, in the one case on path to a demodulator to extract an AC signal indicative of IR absorption, and on an alternate path for fluorescence detection as described above. This arrangement allows simultaneous or sequential measurement of fluorescence and fluorescent enhanced photothermal IR signals at multiple excitation and emission wavelengths. Note that while three emission wavelengths are shown at three excitation/emission wavelengths, this apparatus can be adapted to accommodate as many simultaneous excitation/emission wavelengths desired.

Other Forms of Inelastic Optical Scattering

The technique described herein can also be applied to other forms of inelastic optical scattering, i.e. any other technique that creates wavelength shifted photons, e.g. Raman scattering, Brillouin scattering, and Compton scattering, in which there is a temperature dependence to the scattering efficiency. For example, it is known that the center frequency of certain Raman bands are highly temperature sensitive. By measuring a change in intensity of a specific Raman band in response to IR illumination of the sample, it is possible to measure IR spectra that are localized to the region of the sample responsible for emission of the Raman scattered light.

Super-Resolution

Various super resolution optical techniques exist that are based on fluorescence. These in turn can be used to provide super-resolution IR absorption measurements as any super-resolution technique that improves the spatial resolution of fluorescence detection can also improve the spatial resolution of IR absorption measurements derived from the fluorescence measurement. For example multi-photon techniques, structured illumination, spatially patterned illumination, stimulated emission depletion microscopy, and related techniques can be combined with the apparatus described herein to further improve the spatial resolution.

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Widefield Measurements

It is also possible that detector 124 may be an array detector, for example a linear array, a 2D array or even a widefield camera-based detector. In this case, the detection of IR-induced changes in fluorescent emission can be measured simultaneously at many locations on the sample at once. Such measurements can be performed using time domain measurements (e.g. subtracting camera frames of measured fluorescence with the IR beam on vs off) and/or with lock-in cameras. In the case of widefield measurements it may be desirable to use incoherent probe beam sources, e.g. light emitting diodes, halogen lamps or other incoherent sources to avoid coherence artifacts.

In embodiments, a method of operating a system as described above can be used to obtain measurements of inelastic optical scattering and photothermal infrared measurements from a sample.

In one embodiment, such a method can include illuminating the sample with an infrared beam to create an infrared illuminated region of the sample. The method can further include separately illuminating the sample with a probe beam at least partially overlapping the infrared illuminated region of the sample at an overlap region. The light at the excitation wavelength excites inelastic scattering from the sample via the fluorescent effect, which can be a result of autofluorescence or tagging that has been done to the sample in advance. The probe beam used can be a light beam having an excitation wavelength that is shorter than that of the infrared light, and the excitation wavelength causes excitation and inelastic light scattering from the sample as described above in more detail.

The method can further include detecting, using a suitable detector, the inelastically scattered light emitted from the overlap region of the sample (i.e., the region where the sample is illuminated by both the infrared beam and the probe beam).

The method can then include determining an amount of modulation of detected inelastically scattered light has been received in response to infrared absorption by the sample. This amount of modulation can then be used to detect inelastically scattered light to create a signal indicative of infrared absorption by the sample.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events described herein can be performed concurrently, rather than sequentially.

The various illustrative logical blocks, optical and control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

The invention claimed is:

1. A method of performing infrared imaging of a sample, the method comprising:
    illuminating the sample with a beam of excitation radiation to excite autofluorescent emission from the sample;
    capturing at least a portion of the autofluorescent emission from the sample with a camera-based detector to produce a frame autofluorescent image of the sample;
    illuminating at least a portion of the sample corresponding to the frame autofluorescent image with a beam of infrared radiation;
    capturing at least a portion of the autofluorescent emission from the sample with the camera-based detector while the portion of the autofluorescent emission from the sample is perturbed by the infrared light absorbed by the sample to produce an IR-absorbed frame autofluorescent image; and
    constructing a signal indicative of infrared absorption by the sample using the frame autofluorescent image and the IR-absorbed frame autofluorescent image.

2. The method of claim 1, further comprising capturing a plurality of frame autofluorescent images and a plurality of IR-absorbed frame autofluorescent images, wherein constructing the signal indicative of infrared absorption comprises:
    determining a time averaged light level fluoresced by the region in the IR-absorbed frame autofluorescent image;
    determining a time averaged light level fluoresced by the region in the frame autofluorescent image; and
    comparing the time averaged light level of the IR-absorbed frame autofluorescent image with the time averaged light level of the frame autofluorescent image.

3. The method of claim 1, wherein the camera-based detector has a frame rate of at least a few frames per second.

4. The method of claim 3, wherein the frame rate of the camera-based detector is synchronized with a modulation rate of the beam of infrared radiation by a modulation controller.

5. The method of claim 4, wherein the modulation controller is a lock-in controller.

6. The method of claim 1, wherein the portion of the autofluorescent emission from the sample is perturbed by the infrared light to produce an IR-absorbed frame autofluorescent image while the beam of infrared radiation is incident on the region.

7. The method of claim 1, wherein the autofluorescent emission excited from the sample has at least one wavelength that is shorter than the wavelength of the beam of infrared radiation.

8. The method of claim 1, wherein the infrared source is a broadband infrared source.

9. The method of claim 1, wherein the infrared source is a tunable infrared source having a wavelength that is tunable between 2-25 microns.

10. The method of claim 1, wherein the excitation radiation has a wavelength that is outside of a range of the infrared light source.

11. The method of claim 1, wherein constructing the signal is performed by at least one of a lock-in amplifier, a notch filter, an RMS-to-DC converter, a Fourier transform, and a resonant amplifier.

12. The method of claim 1, wherein the sample comprises at least one of a biological cell, a biological tissue, and a biological organism.

13. A microscope system of performing infrared imaging of a sample, the microscope system comprising:
    an excitation light source configured to illuminate the sample with a beam of excitation radiation to excite autofluorescent emission from the sample;
    a camera-based detector arranged to capture at least a portion of the autofluorescent emission from the sample to produce a frame autofluorescent image of the sample;
    an infrared light source configured to illuminate at least a portion of the sample corresponding to the frame autofluorescent image with a beam of infrared radiation;
    a camera-based detector configured to capture at least a portion of the autofluorescent emission from the sample while the portion of the autofluorescent emission from the sample is perturbed by the infrared light absorbed by the sample to produce the IR-absorbed frame autofluorescent image; and a processor configured to construct a signal indicative of infrared absorption by the sample using the autofluorescent frame and the autofluorescent IR-absorbed frame.

14. The system of claim 13, further comprising capturing a plurality of autofluorescent frames and a plurality of autofluorescent IR-absorbed frames, wherein constructing the signal indicative of infrared absorption comprises:
   determining a time averaged light level fluoresced by the region in the IR-absorbed frame autofluorescent image;
   determining a time averaged light level fluoresced by the region in the frame autofluorescent image; and
   comparing the time averaged light level of the IR-absorbed frame autofluorescent image with the time averaged light level of the frame autofluorescent image.

15. The system of claim 13, wherein the camera-based detector has a frame rate of at least a few frames per second.

16. The system of claim 15, wherein the frame rate of the camera-based detector is synchronized with a modulation rate of the beam of infrared radiation by a modulation controller.

17. The system of claim 16, wherein the modulation controller is a lock-in controller.

18. The system of claim 13, wherein the portion of the autofluorescent emission from the sample is perturbed by the infrared light absorbed by the sample to produce a IR-absorbed frame autofluorescent image while the beam of infrared radiation is incident on the region.

19. The system of claim 13, wherein the autofluorescent emission excited from the sample has at least one wavelength that is shorter than the wavelength of the beam of infrared radiation.

20. The system of claim 13, wherein the infrared source is a broadband infrared source.

21. The system of claim 13, wherein the infrared source is a tunable infrared source having a wavelength that is tunable between 2-25 microns.

22. The system of claim 13, wherein the excitation radiation has a wavelength that is outside of a range of the infrared light source.

23. The system of claim 13, wherein constructing the signal is performed by at least one of a lock-in amplifier, a notch filter, an RMS-to-DC converter, a Fourier transform, and a resonant amplifier.

24. The system of claim 13, wherein the sample comprises at least one of a biological cell, a biological tissue, and a biological organism.

* * * * *